Figure 1:
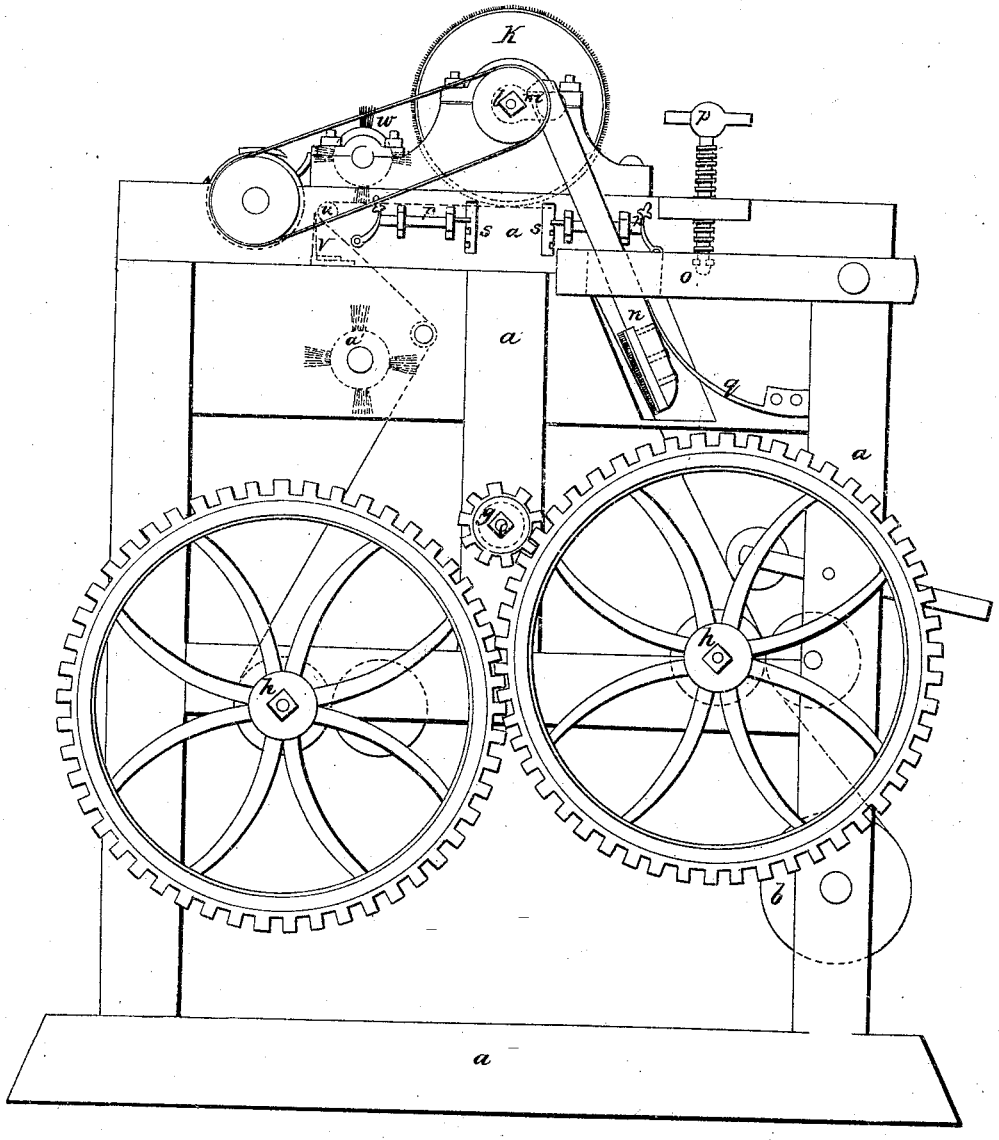
Figure 2:
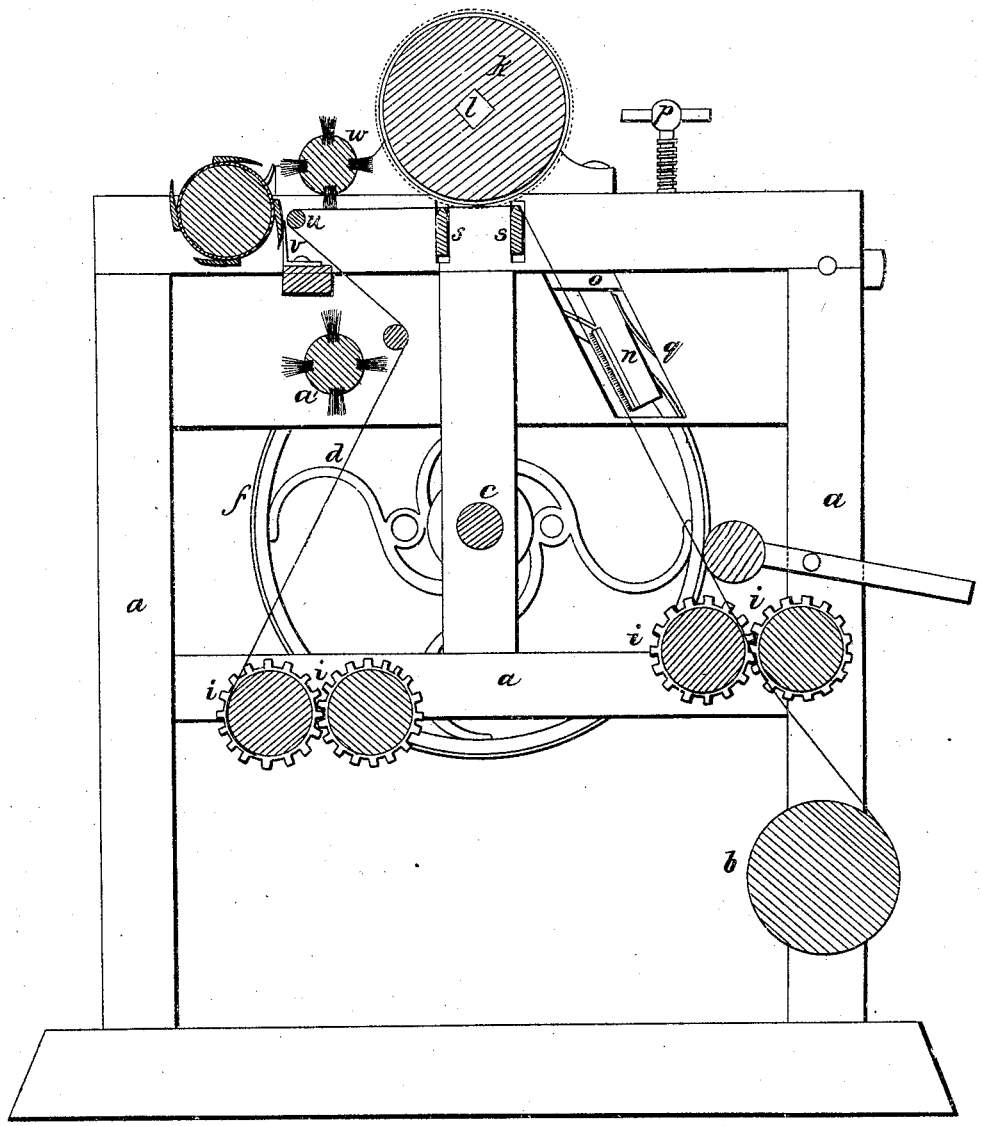
Figure 3:
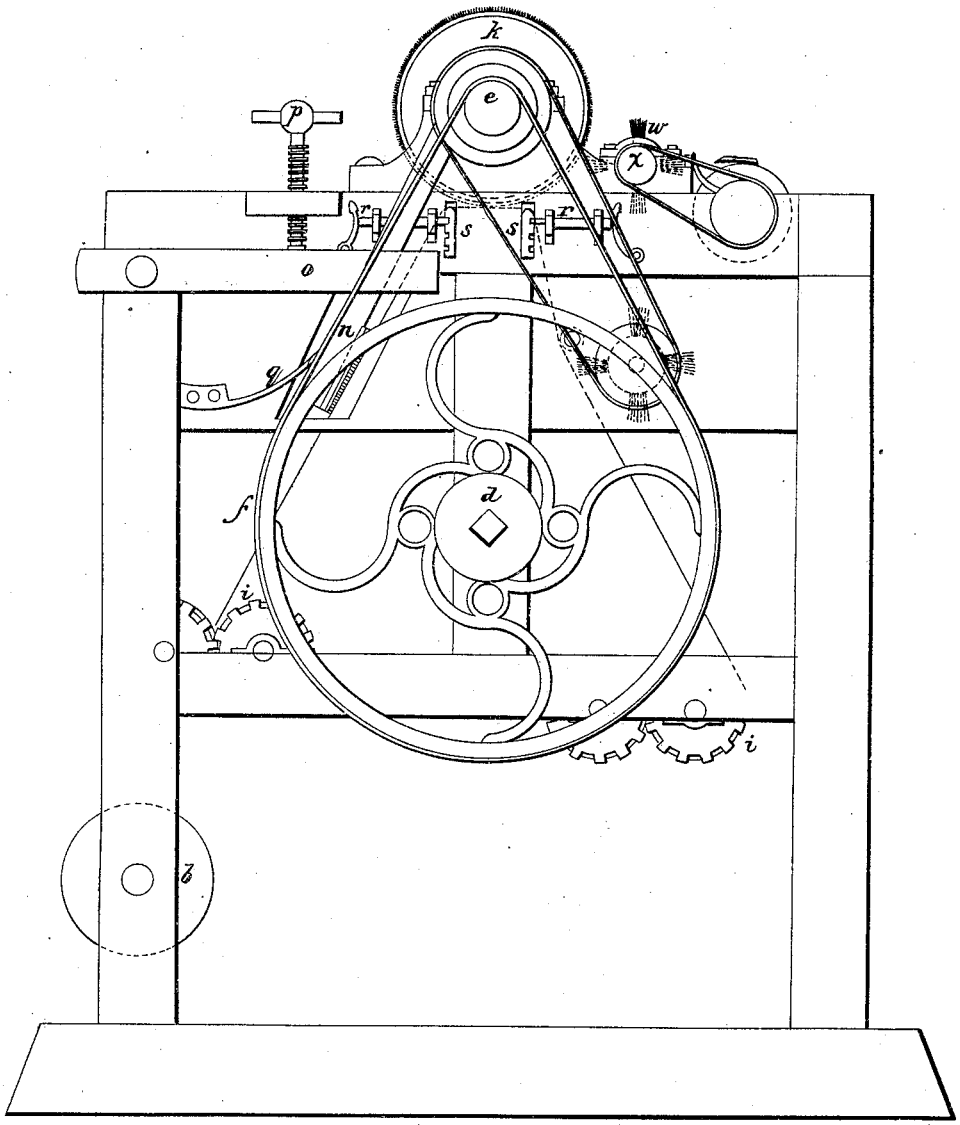
Figure 4:
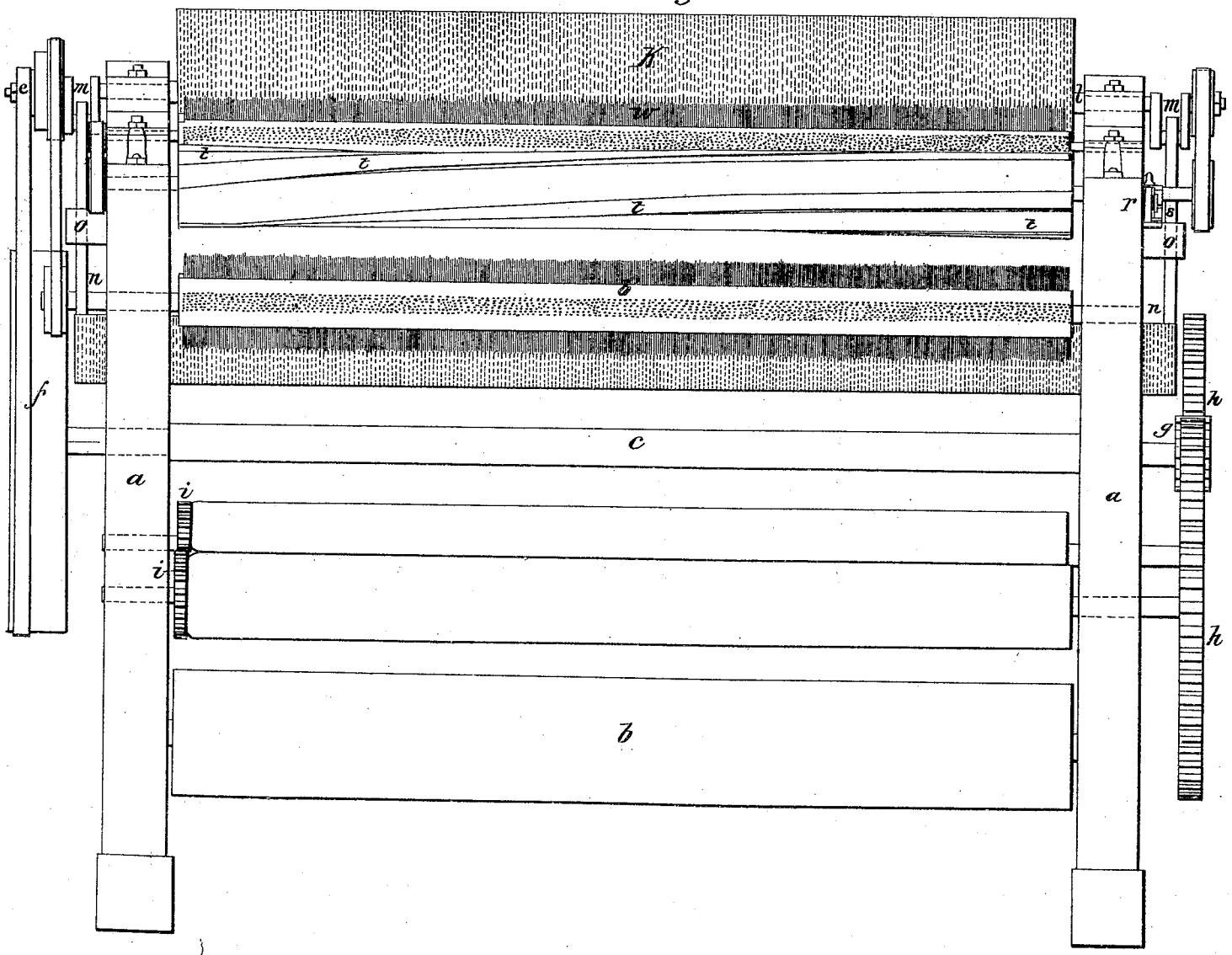

2997X No Printed Specification Available

Sheet 1. 4 Sheets.

J. J. Bryent.

Cloth Dressing Mach.

Patented Sep. 2, 1818.

N. PETERS, PHOTO-LITHOGRAPHER, WASHINGTON, D. C.

2997X

Sheet 2. 4 Sheets.

J. J. Bryent.
Cloth Dressing Mach.

Patented Sept. 2, 1818.

N. PETERS, PHOTO-LITHOGRAPHER, WASHINGTON, D. C.

2997X

Sheet 3. 4 Sheets.

J. J. Bryant.

Cloth Dressing Mach.

Patented Sept. 2, 1818.

N. PETERS, PHOTO-LITHOGRAPHER, WASHINGTON, D. C.

2997X

Sheet 4. 4 Sheets.

J. J. Bryent.

Cloth Dressing Mach.

Patented Sept. 2, 1818.

N. PETERS, PHOTO-LITHOGRAPHER, WASHINGTON, D. C.

United States Patent Office

PTO - BOYERS, PA Duty Station

MISSING PAGE TEMPORARY NOTICE

PATENT # 2997X FOR ISSUE DATE 9-2-1818

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa